US012373193B2

(12) United States Patent
Paulraj et al.

(10) Patent No.: US 12,373,193 B2
(45) Date of Patent: *Jul. 29, 2025

(54) SYSTEMS AND METHODS FOR COORDINATED FIRMWARE UPDATE USING MULTIPLE REMOTE ACCESS CONTROLLERS

(71) Applicant: Dell Products, L.P., Round Rock, TX (US)

(72) Inventors: Deepaganesh Paulraj, Bangalore (IN); Rama Rao Bisa, Bangalore (IN); Rajeshkumar Ichchhubhai Patel, Bangalore (IN); Mahesh Babu Ramaiah, Bangalore (IN); Pavan Kumar Gavvala, Bangalore (IN); Naveen Karthick Chandrasekaran, Bangalore (IN); Chandrasekhar R, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 45 days.

This patent is subject to a terminal disclaimer.

(21) Appl. No.: 17/934,837

(22) Filed: Sep. 23, 2022

(65) Prior Publication Data
US 2024/0103846 A1    Mar. 28, 2024

(51) Int. Cl.
*G06F 8/656* (2018.01)
(52) U.S. Cl.
CPC .................... *G06F 8/656* (2018.02)

(58) Field of Classification Search
CPC ..................................................... G06F 8/656
See application file for complete search history.

(56) References Cited

U.S. PATENT DOCUMENTS 8,285,828 B2 * 10/2012 Shah ..................... H04L 67/125
717/136
10,606,784 B1 * 3/2020 Jreij ..................... G06F 13/4282
(Continued)

OTHER PUBLICATIONS

Richelle et al; Platform Level Data Model (PLDM) for Firmware Update Specification, 92 pages (Year: 2019).*

Primary Examiner — Wei Y Zhen
Assistant Examiner — Brahim Bourzik
(74) Attorney, Agent, or Firm — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include first and second Remote Access Controllers (RACs) that each includes computer-executable instructions to receive, by the first RAC, a firmware update image associated with the firmware device, and commence transfer of the firmware update image to the firmware device to perform a firmware update on the firmware device using an update mode that restricts another update request to the firmware device until the first RAC finishes or cancels the firmware update. When the transfer is halted prior to completion, the program instructions cause the second RAC to determine where the firmware update image transfer was halted, and commence transferring the remainder of the firmware update image that has not yet been transferred to the firmware device.

17 Claims, 5 Drawing Sheets

(56) References Cited

U.S. PATENT DOCUMENTS

| | | | |
|---|---|---|---|
| 2015/0363391 A1* | 12/2015 | Mungi | G06F 40/211 |
| | | | 704/9 |
| 2018/0107572 A1* | 4/2018 | Khemani | G06F 11/2097 |
| 2020/0133912 A1* | 4/2020 | Gupta | G06F 13/4282 |
| 2021/0349709 A1* | 11/2021 | Nakatsukasa | G06F 8/656 |
| 2024/0103829 A1* | 3/2024 | Ramaiah | G06F 8/654 |
| 2024/0103832 A1* | 3/2024 | Chandrasekaran | G06F 8/65 |
| 2024/0103971 A1* | 3/2024 | Vishwanath | G06F 8/65 |
| 2024/0241748 A1* | 7/2024 | Ballard | G06F 21/6209 |

* cited by examiner

SYSTEMS AND METHODS FOR COORDINATED FIRMWARE UPDATE USING MULTIPLE REMOTE ACCESS CONTROLLERS

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. To update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

Embodiments of systems and methods to provide a firmware update to devices configured in a redundant configuration in an Information Handling System (IHS) are disclosed. In an illustrative, non-limiting embodiment, an IHS may include first and second Remote Access Controllers (RACs) that each includes computer-executable instructions to receive, by the first RAC, a firmware update image associated with the firmware device, and commence transfer of the firmware update image to the firmware device to perform a firmware update on the firmware device using an update mode that restricts another update request to the firmware device until the first RAC finishes or cancels the firmware update. When the transfer is halted prior to completion, the program instructions cause the second RAC to determine where the firmware update image transfer was halted, and commence transferring the remainder of the firmware update image that has not yet been transferred to the firmware device.

According to another embodiment, a coordinated firmware update method includes the steps of receiving, by a first Remote Access Controller (RAC), a firmware update image associated with a firmware device configured in an Information Handling System (IHS), commencing, by the first RAC, transfer of the firmware update image to the firmware device to perform a firmware update on the firmware device using an update mode that restricts another update request to the firmware device until the first RAC finishes or cancels the firmware update, determining, by a second RAC where the firmware update image transfer was halted, and commence transferring, by the second RAC, the remainder of the firmware update image that has not yet been transferred to the firmware device.

According to yet another embodiment, a memory storage device is configured with program instructions that, upon execution by an Information Handling System (IHS), cause the IHS to receive, by the first RAC, a firmware update image associated with the firmware device, commence transfer of the firmware update image to the firmware device to perform a firmware update on the firmware device using an update mode that restricts another update request to the firmware device until the first RAC finishes or cancels the firmware update, and when the transfer is halted prior to completion, the program instructions cause the second RAC to determine where the firmware update image transfer was halted, and commence transferring the remainder of the firmware update image that has not yet been transferred to the firmware device.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
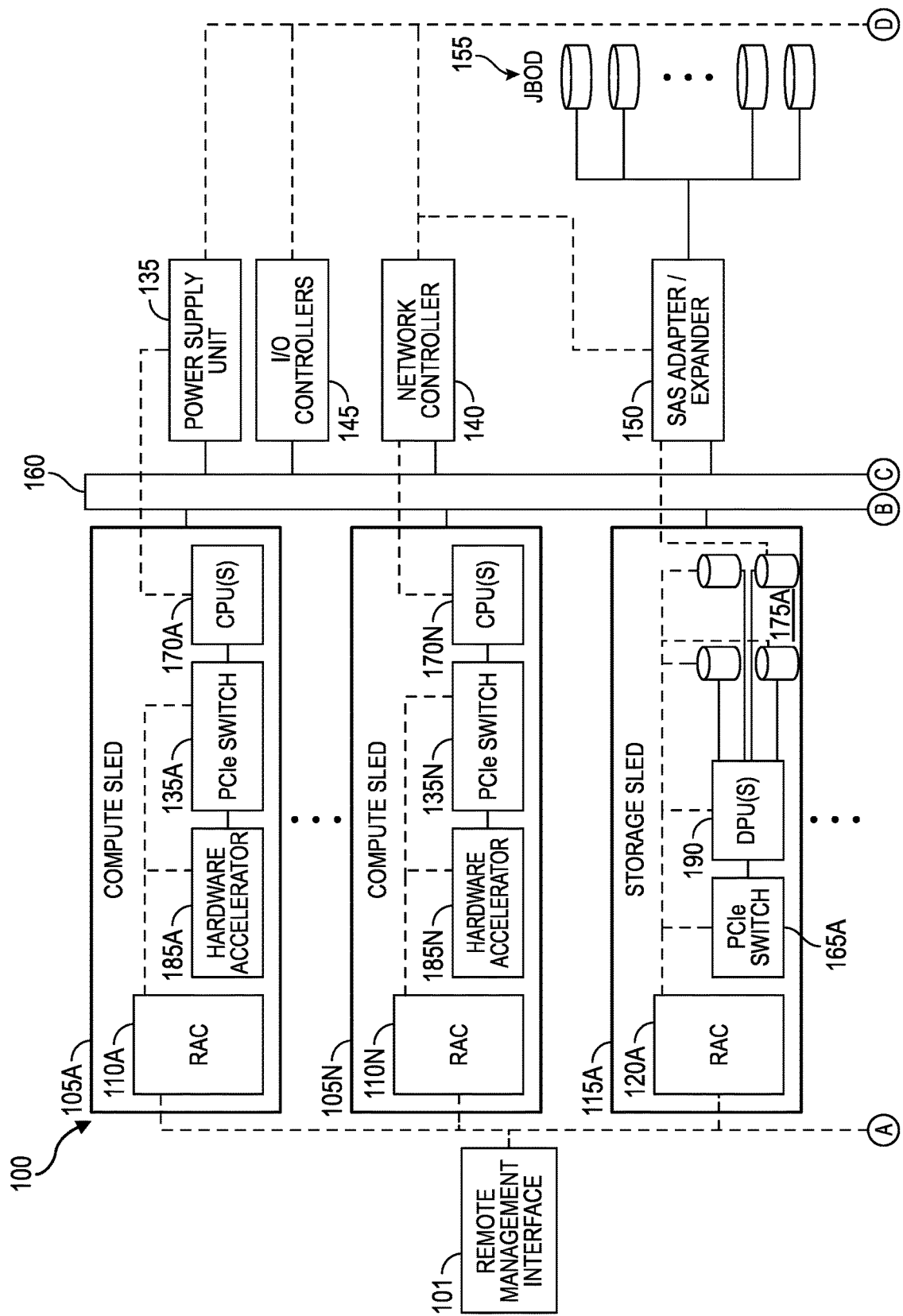
FIGS. 1A and 1B illustrate certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Firmware updates of server components is an important aspect of the life cycle management of an Information Handling System (IHS), (e.g., server, host, etc.). Traditional means of updating IHS firmware devices have involved migrating the workloads running on the host Operating System (OS), creating a reboot job, rebooting the IHS, and performing the firmware update. Additionally, the IHS is again rebooted to activate the new firmware on the IHS components. This process, however, may not be customer friendly as the IHS is often required to be down for the firmware update process, thus impacting business. Because IHSs are forced to reboot to perform the firmware updates, customers often wait for its maintenance cycle to update the IHS components, thus missing the new firmware features, security fixes, performance improvements, and the like. As such, rebootless updates may be an important aspect of efficient computer operations. Using rebootless updates, users may be enabled with performing the updates without rebooting the servers and get more useful features above what today's industry specifications can provide.

Customers often upgrade the firmware in the IHSs of a data center for assorted reasons, such as to meet compliance policies, to take advantage of new features, enhancements to the IHS, deploy security fixes, and the like. IHSs that are NVMe-MI/PLDM Specification compliant can take advantage of updating firmware to all IHSs in a system or in a cluster without rebooting the IHSs. Devices that support Platform Level Data Model (PLDM) offers an option for a Remote Access Controller (RAC) to update the firmware without rebooting the IHS. Thus, downtime is often not incurred during the firmware update process. The RAC may be configured to provide out-of-band management facilities for an IHS, even if it is powered off, or powered down to a standby state. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)).

The RAC may support rebootless firmware updates for firmware devices, such as non-volatile storage (e.g., hard disks, Solid State Drives (SSDs), etc.), Network Interface Cards (NICs), Graphical Processing Units (GPUs), RACs, Hardware RAID (HWRAID) devices, and the like. With the rebootless feature, when a firmware update image is uploaded using a RAC user interface, all the firmware devices supported by the firmware update image may be automatically selected and updated using rebootless update methods in the real-time without rebooting the IHS.

A RAC may implement a Platform Management Components Intercommunication (PMCI) interface stack that is provided by the Distributed Management Task Force (DMTF), and specifies a Management Component Transport Protocol (MCTP) that describes how data travels over certain physical layers, such as the peripheral component interconnect express (PCIe) and I2C/SMBus. Additionally, the PMCI interface stack may further include the Platform Level Data Model (PLDM) protocol that enables information to travel over the MCTP transport layer and can be used for platform management, such as firmware updates. The PLDM protocol, however, only specifies the use of a single firmware update function within a given PLDM subsystem. That is, to remain PLDM compliant, the firmware device is required to enter an update mode that restricts another update request to the firmware device until the RAC functioning as the firmware update function finishes or cancels the firmware update. As will be described in detail herein below, embodiments of the present disclosure provide a solution to this problem, among other problems, via a coordinated firmware update system and method that uses two or more RACs in which at least one of the RACs is configured as a proxy device to ensure that the firmware update is successfully transferred in a manner that is transparent to the firmware device's PLDM compliant protocol.

Figure 1B:
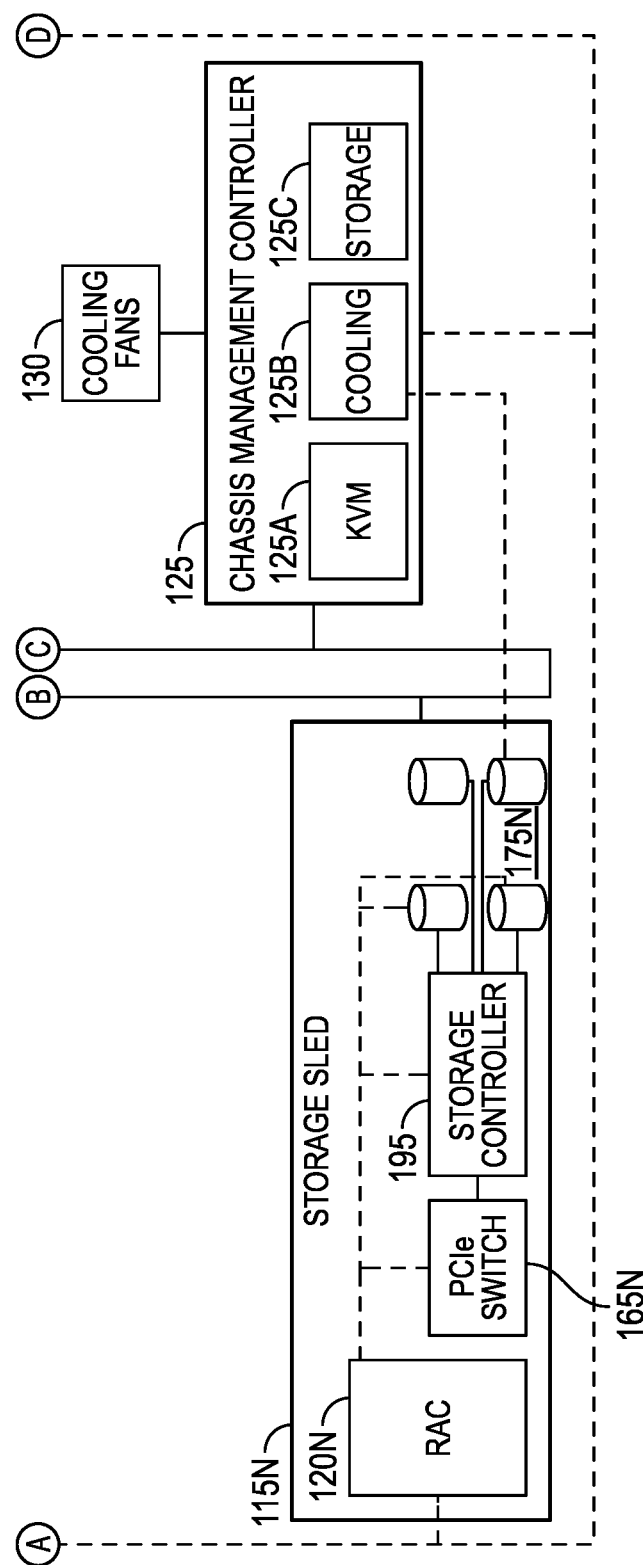

FIGS. 1A and 1B illustrate certain components of a chassis 100 comprising one or more compute sleds 105a-n and one or more sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the storage sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
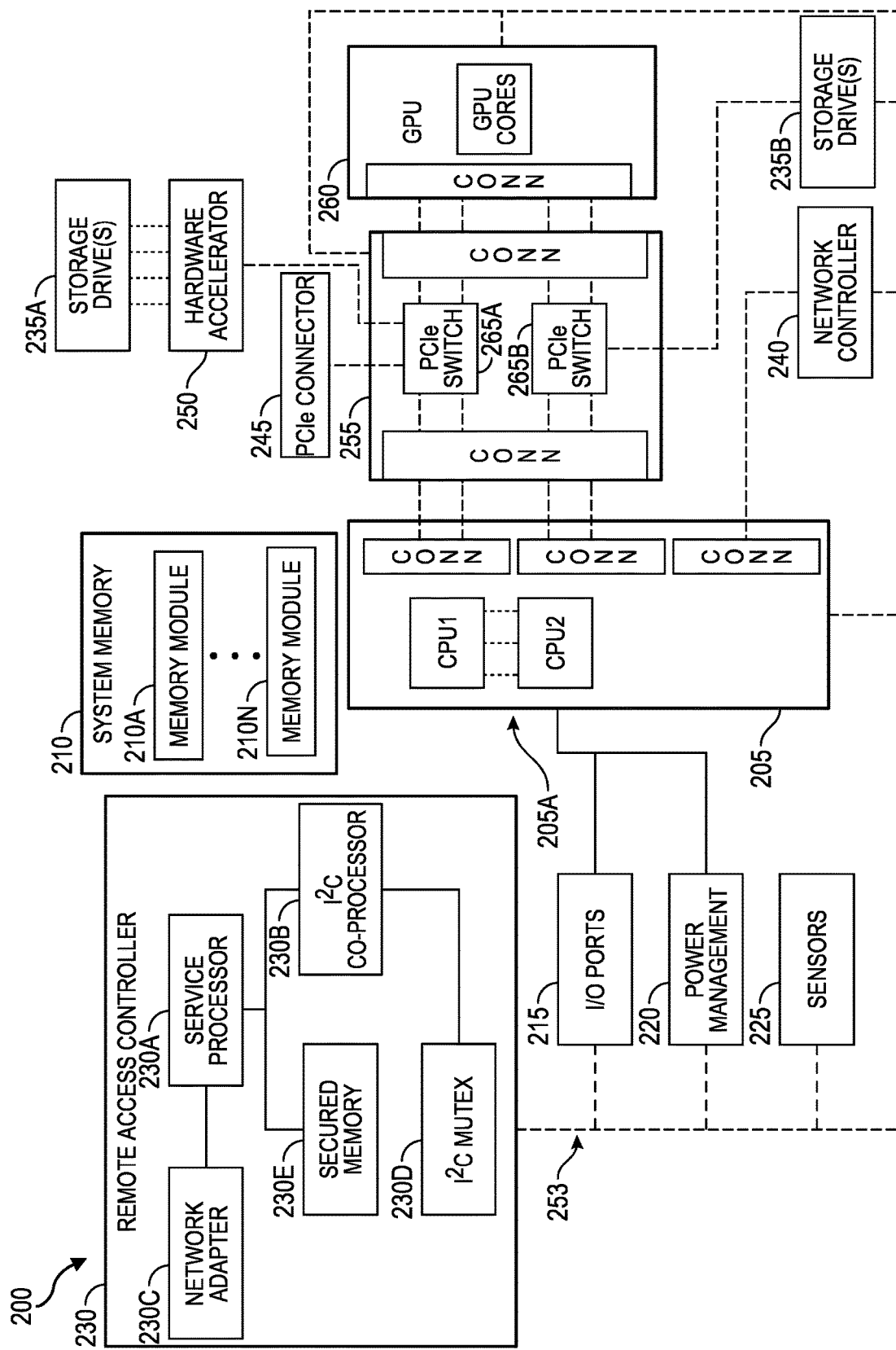
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190, and thus without relying on the main CPU of the storage sled 115a, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such JBOD storage resources 155 may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various JBOD storage resources 155. The additional JBOD storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, a storage component such as sled 115a-n or other type of server, such as an 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules 210a-n. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
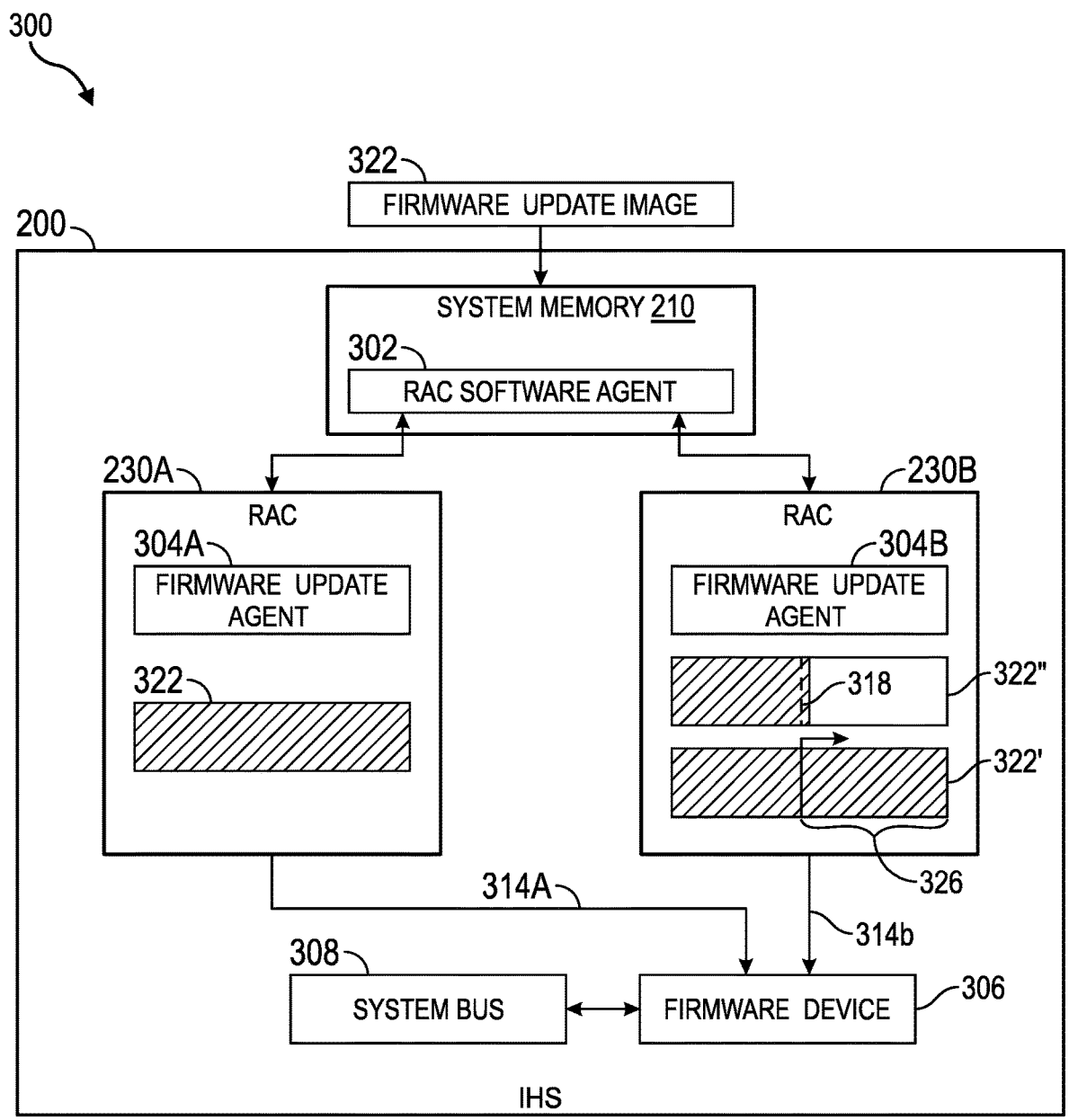
FIG. 3 is a diagram illustrating several components of an example associated IHS showing how those components may communicate with one another for implementing a coordinated firmware update system according to one embodiment of the present disclosure.

FIG. 3 is a diagram 300 illustrating several components of an example associated IHS 200 showing how those components may communicate with one another for implementing a coordinated firmware update system 300 according to one embodiment of the present disclosure. The IHS 200 is shown with a system memory 210, two RACs 230a-b (collectively 230), and a firmware device 306 that is coupled to the IHS 200 via a system bus 308. The firmware device 306 may be any IHS configurable device that may be updated with new firmware updates at an ongoing basis. For example, the firmware device 306 may include a nonvolatile storage unit (e.g., hard disks, Solid State Drives (SSDs), etc.), Network Interface Cards (NICs), Graphical Processing Units (GPUs), RACs, Hardware RAID (HWRAID) devices, and the like. Citing a particular example, the firmware device 306 may include a storage drive 235b, those that are configured on a storage sled 115a-n, and/or storage resources 155 configured in a JBOD, such as described herein above with reference to FIGS. 1 and 2. The firmware device 306 communicates with the IHS 200 via system bus 308, which in one embodiment, may include a Peripheral Component Interconnect Express (PCIe) bus. Additionally, each firmware device 306 may communicate with either of the RACs 230 using any suitable connection 314a-b (collectively 314), such as an i2c connection, an I3C SENSEWIRE connection, a serial peripheral interface (SPI) based connection, and/or a Management Component Transport Protocol (MCTP) PCIe vendor defined message (VDM) channel.

Each RAC 230 is provided to, among other things, manage firmware updates to the firmware device 306. While the present disclosure describes a RAC for managing the firmware updates, it should be appreciated that in other embodiments, the CPU 205, GPU 260, and/or Chassis Management Controller 125 may be configured to perform such tasks without departing from the spirit and scope of the present disclosure. The RACs 230 communicate with the IHS 200 via a RAC software agent 302. The RAC software agent 302 is a lightweight software service that is executed on the host IHS 200 to integrate certain operating system (OS) features with the RACs 230. The RAC software agent 302 provides OS-related information to the RACs 230, and may add capabilities such as LC log event replication into the OS log, WMI support (including storage), RAC SNMP alerts via OS, RAC hard reset and remote full Power Cycle. For example, the RAC software agent 302 may be an iDRAC Service Module (iSM) that is configured to operate with the integrated Dell remote access controller (iDRAC), which are both provided by DELL TECHNOLOGIES.

The IHS 200 may receive a firmware update image 322 that is to be installed on the firmware device 306. The RAC 230a, 230b each store and execute a firmware update agent 304a, 304b, respectively, to manage rebootless firmware updates for the firmware device 306 in the IHS 200. In one embodiment, each firmware update agent 304a, 304b may implement a Platform Management Components Intercommunication (PMCI) interface stack that is provided by the Distributed Management Task Force (DMTF), and specifies a Platform Level Data Model (PLDM) protocol that enables information to travel over the MCTP transport layer and can be used for, among other things, performing firmware updates on firmware devices 306 that are PLDM compliant.

According to embodiments of the present disclosure, the coordinated firmware update system 300 firmware update agents 304a-b (collectively 304) are provided in the two RACs 230 to perform a PLDM firmware update on the firmware device 306. In general, the first RAC 230a may receive a firmware update image 322, such as from a remote management interface 101 as shown and described above with reference to FIG. 1. Nevertheless, it should be appreciated that the firmware update image 322 may be received from any suitable source, such as from an online support portal managed by a vendor of the firmware device 306. When received, the firmware update agent 304a stores the firmware update image 322 in a memory of the first RAC 230a. Prior to starting transfer of the of the firmware update image 322 to the firmware device 306, the firmware update agent 304a registers the second RAC 230b as a proxy to the firmware device 306, thus causing the second RAC 230b to receive and process the firmware update image 322 in a similar manner to how the firmware device 306 receives and processes the firmware update image 322. Also prior to starting transfer of the firmware update image 322 to the firmware device 306, the firmware update agent 304a creates a replicated firmware update image 322' in the second RAC 230b. When the firmware update agent 304a commences transfer of the firmware update image 322 to the firmware device 306, the second RAC 230b also progressively receives and stores the replicated firmware update image 322' in its memory. In one embodiment, the firmware update agent 304b may maintain a pointer 318 to the latest portion of the firmware update image 322 that has been successfully transferred. In the event that the firmware update agent 304a fails to continue transferring the firmware update agent copy 322 for any reason, the pointer 318 may be used by the firmware update agent 304b to pick up where the firmware update agent 304a left off by sending the remaining portion 326 of the firmware update image 322 that has not yet been transferred to the firmware device 306.

Should the firmware update agent 304a in the first RAC 230a successfully transfer the entire firmware update image 322 to the firmware device 306, the firmware update agent 304b may compare the transferred firmware update image 230" that was recently received with the replicated firmware update image 322' that was received prior to commencing the transfer to ensure the integrity of the transferred firmware update image 322", and if they match, send a notification or other type of message to the firmware update agent 304a in the first RAC 230a that the transfer was successfully accomplished. Thus, the reliability of the firmware update agent transfer to the firmware device 306 may be enhanced by ensuring the firmware update agent 322 is successfully transferred even when the first RAC 230a fails to transfer the firmware update image 322 to completion. Additionally, broken downloads may be averted in which the firmware device 306 has only been partially downloaded with firmware, a problem that could otherwise severely damage the firmware device's operation, such as condition in which the firmware device 306 is bricked (e.g., it will not function properly to the point that it may not be able to accept another firmware update image to correct its behavior). Additional details describing how the first and second RACs 230 function together to transfer the firmware update image 322 to the firmware device 306 will be described in detail herein below.

Figure 4:
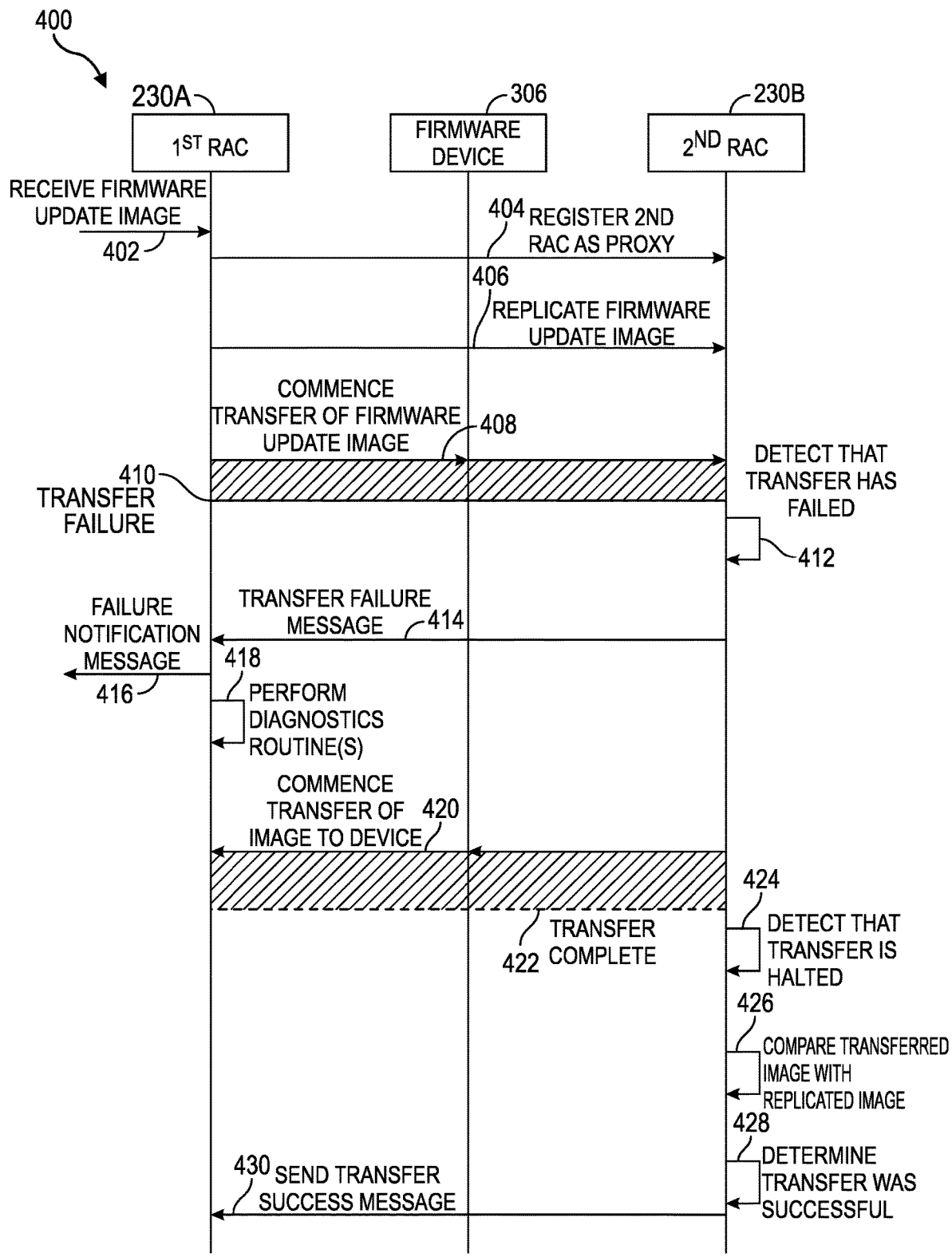
FIG. 4 is a flow diagram illustrating an example coordinated firmware update method depicting how a firmware device configured in an IHS may be updated by multiple RACs according to one embodiment of the present disclosure.

FIG. 4 is a flow diagram illustrating an example coordinated firmware update method 400 depicting how a firmware device 306 configured in an IHS 200 may be updated by multiple RACs 230 according to one embodiment of the present disclosure. In one embodiment, the coordinated firmware update method 400 may be performed in whole, or in part, by the firmware update agents 304 configured in first and second RACs 230 as described herein above. Initially, a new software package or an updated version of an existing software package is promoted or made available by a provider of the software package and/or the firmware device 306 that the software package supports.

Initially at step 402, the first RAC 230a receives and stores a firmware update image 322 associated with a firmware device 306 to be updated. The firmware update image 322 may be received, for example, from remote management controller 101 or from an online support portal managed by a vendor of the firmware device 306. Thereafter at step 404, the first RAC 230a registers the second RAC 230b as a proxy. Registering the second RAC 230b as a proxy causes the second RAC 230*b* to receive and store the firmware update image 322 as a replicated copy 322' in its memory simultaneously with the firmware device 306. In one embodiment, the second RAC 230*b* may be configured to use the same communication link 314 that is used by the firmware device 306 to receive the firmware update image 322. In this manner, problems that may exist on the communication link 314 used to transfer the firmware update image 322 may be detected by the second RAC 230*b*. At step 406, the first RAC 230*a* replicates the firmware update image 322 on the second RAC 230*b*.

Steps 408-418 describe a series of actions that may be taken by the method 400 in a scenario in which the transfer of the firmware update image fails for any reason. At step 408, the first RAC 230*a* commences transfer of the firmware update image to the firmware device 306. Sometime during the transfer of the firmware update image, the transfer fails at step 410. At step 412, the second RAC 230*b* detects that the transfer has failed. For example, the second RAC 230*b* may detect that the transfer has failed by, following a specified duration of time in which no data associated with the firmware update image has been received, compare the transferred firmware update image with the replicated firmware update image to determine that only part of the whole firmware update image has been received. For another example, the second RAC 230*b* may detect that the transfer has failed because the last element of transferred firmware update image data does not include an End Of File (EOF) sequence of characters. Thus, the second RAC 230*b* sends a transfer failure notification message to the first RAC 230*a* at step 414, which in turn, causes the first RAC 230*a* to forward the failure notification, such as, to the remote management interface 101 at step 416. In other embodiments, the second RAC 230*b* may send the failure notification message directly to the remote management interface 101 or other entity supporting firmware device update without relaying the failure notification message through the first RAC 230*a*.

At step 418, the first RAC 230*a* may optionally perform one or more diagnostics routines. For example, the first RAC 230*a* may verify that the second RAC 230*b* is still functioning as a proxy and that replicated firmware update image 322' is still stored in the second RAC 230*b*.

Steps 420-430 describe actions that may be taken by the method 400 in a scenario in which the firmware update image is successfully transferred to the firmware device 306. At step 420, the first RAC 230*a* commences transfer of the firmware update image to the firmware device 306. At some later point in time, the transfer completes at step 422. At step 424, the second RAC 230*b* detects that the transfer is halted, for example, by not receiving any firmware update image data within the specified duration of time, and/or by detecting the EOF sequence at the end of the transferred firmware update image. The second RAC 230*b* then compares the transferred firmware update image 322" with the replicated firmware update image 322' of the firmware update image at step 426, and determines that the transfer was successful when they match at step 428. The second RAC 230*b* then sends a transfer success message to the first RAC 230*a* at step 430, which is then forwarded by the first RAC 230*a* to the entity supporting the firmware update process, such as remote management interface 101.

The aforedescribed method 400 may be performed each time a firmware update image 322 is to be updated on one or more firmware devices 306 on an IHS 200. Nevertheless, when use of the coordinated firmware update method 400 is no longer needed or desired, the process ends.

Although FIG. 4 describes an example method 400 that may be performed to transfer firmware update images to a firmware device 306 in an IHS 200, the features of the disclosed processes may be embodied in other specific forms without deviating from the spirit and scope of the present disclosure. For example, certain steps of the disclosed method 400 may be performed sequentially, or alternatively, they may be performed concurrently. As another example, the method 400 may perform additional, fewer, or different operations than those operations as described in the present example. As yet another example, although the firmware update method 400 appears to show that a single firmware device 306 is updated, it should be appreciated that multiple firmware devices 306 may be configured to receive the firmware update image simultaneously, that is, at the same time.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising: a firmware device; and first and second Remote Access Controllers (RACs) coupled to a device configured in the IHS, the first and the second RACs each comprising a processor and a memory coupled to the at least one processor, the memory having program instructions stored thereon that, upon execution by the processor, cause the first and the second RAC to:

receive, by the first RAC, a firmware update image associated with the firmware device;
register the second RAC as a proxy to receive the firmware update image as the firmware device receives the firmware update image from the first RAC;
replicate, by the first RAC, the firmware update image in the second RAC prior to commencing transfer of the firmware update image to the firmware device;
and when the transfer of the firmware update image is successfully completed, send, by the second RAC, a transfer success message to the first RAC when the transferred firmware update image matches the replicated firmware update image;
commence transfer, by the first RAC, of the firmware update image to the firmware device to perform a firmware update on the firmware device using an update mode that restricts another update request to the firmware device until the first RAC finishes or cancels the firmware update;
and when the second RAC detects that the transfer is halted prior to completion, the program instructions cause the second RAC to:
determine where the firmware update image transfer was halted; and commence transferring the remainder of the firmware update image that has not yet been transferred to the firmware device.

2. The IHS of claim 1, wherein the first and the second RACs comprise a Platform Management Components Intercommunication (PMCI) interface stack that is configured to transfer the firmware update image according to a Platform Level Data Model (PLDM) protocol.

3. The IHS of claim 1, wherein the instructions, upon execution, cause the first and the second RAC to when the transfer is halted by the first RAC, identify, by the second RAC, an un-transferred portion of the firmware update image according to where the transfer ceased being received.

4. The IHS of claim 1, wherein the instructions, upon execution, cause the first and the second RAC to perform the firmware update on a plurality of firmware devices, wherein the firmware update image is simultaneously transferred to the plurality of firmware devices.

5. The IHS of claim 1, wherein the instructions, upon execution, cause the first and the second RAC to transfer the firmware update image to the second RAC using a communication link that is similar to the communication link used to transfer the firmware update image to the firmware device.

6. The IHS of claim 1, wherein the instructions, upon execution, cause the first RAC to receive the firmware update image from at least one of a remote management interface or an online portal.

7. A coordinated firmware update method comprising: receiving, by a first Remote Access Controller (RAC), a firmware update image associated with a firmware device configured in an Information Handling System (IHS); registering, by the first RAC, a second RAC as a proxy to receive the firmware update image as the firmware device receives the firmware update image from the first RAC:
replicating, by the first RAC, the firmware update image in the second RAC prior to commencing transfer of the firmware update image to the firmware device; and
when the transfer of the firmware update image is successfully completed, sending, by the second RAC, a transfer success message to the first RAC when the transferred firmware update image matches the replicated firmware update image;
commencing, by the first RAC, transfer of the firmware update image to the firmware device to perform the firmware update on the firmware device using an update mode that restricts another update request to the firmware device until the first RAC finishes or cancels the firmware update; determining, by the second RAC where the firmware update image transfer was halted; and commence transferring, by the second RAC, the remainder of the firmware update image that has not yet been transferred to the firmware device.

8. The coordinated firmware update method of claim 7, further comprising transferring the firmware update image according to a Platform Level Data Model (PLDM) protocol.

9. The coordinated firmware update method of claim 7, further comprising when the transfer is halted by the first RAC, identifying, by the second RAC, an un-transferred portion of the firmware update image according to where the transfer ceased being received.

10. The coordinated firmware update method of claim 7, further comprising performing the firmware update on a plurality of the firmware devices, wherein the firmware update image is simultaneously transferred to the plurality of firmware devices.

11. The coordinated firmware update method of claim 7, further comprising transferring the firmware update image to the second RAC using a communication link that is similar to the communication link used to transfer the firmware update image to the firmware device.

12. The coordinated firmware update method of claim 7, further comprising receiving the firmware update image from at least one of a remote management interface or an online portal.

13. A non-transitory memory storage device having program instructions stored thereon that, upon execution by one or more processors of an Information Handling System (IHS), cause the IHS to: receive, by a first Remote Access Controller (RAC), a firmware update image associated with a firmware device; register a second RAC as a proxy to receive the firmware update image as the firmware device receives the firmware update image from the first RAC;
replicate, by the first RAC, the firmware update image in the second RAC prior to commencing transfer of the firmware update image to the firmware device; and
when the transfer of the firmware update image is successfully completed, send, by the second RAC, a transfer success message to the first RAC when the transferred firmware update image matches the replicated firmware update image;
commence transfer, by the first RAC, of the firmware update image to the firmware device to perform a firmware update on the firmware device using an update mode that restricts another update request to the firmware device until the first RAC finishes or cancels the firmware update; when the transfer is halted prior to completion, the program instructions cause the second RAC to: determine where the firmware update image transfer was halted; and commence transferring the remainder of the firmware update image that has not yet been transferred to the firmware device.

14. The non-transitory memory storage device of claim 13, wherein the instructions, upon execution, cause the first and the second RAC to when the transfer is halted by the first RAC, identify, by the second RAC, an un-transferred portion of the firmware update image according to where the transfer ceased being received.

15. The non-transitory memory storage device of claim 13, wherein the instructions, upon execution, cause the first and the second RAC to perform the firmware update on a plurality of firmware devices, wherein the firmware update image is simultaneously transferred to the plurality of firmware devices.

16. The non-transitory memory storage device of claim 13, wherein the instructions, upon execution, cause the first and the second RAC to transfer the firmware update image to the second RAC using a communication link that is similar to the communication link used to transfer the firmware update image to the firmware device.

17. The non-transitory memory storage device of claim 13, wherein the instructions, upon execution, cause the first RAC to receive the firmware update image from at least one of a remote management interface or an online portal.

* * * * *